(12) United States Patent
Hodne

(10) Patent No.: US 10,317,877 B2
(45) Date of Patent: Jun. 11, 2019

(54) SYSTEM FOR CONTROLLING REMOTELY CONTROLLED EQUIPMENT

(71) Applicant: MHWIRTH AS, Kristiansand (NO)

(72) Inventor: Jens Hodne, Kristiansand (NO)

(73) Assignee: MHWIRTH AS, Kristiansand (NO)

( * ) Notice: Subject to any disclaimer, the term of this patent is extended or adjusted under 35 U.S.C. 154(b) by 0 days.

(21) Appl. No.: 15/550,025

(22) PCT Filed: Jan. 19, 2016

(86) PCT No.: PCT/NO2016/050007
§ 371 (c)(1),
(2) Date: Aug. 10, 2017

(87) PCT Pub. No.: WO2016/130015
PCT Pub. Date: Aug. 18, 2016

(65) Prior Publication Data
US 2018/0024528 A1    Jan. 25, 2018

(30) Foreign Application Priority Data
Feb. 13, 2015 (NO) .................................. 20150215

(51) Int. Cl.
*G05B 9/02* (2006.01)
*G05B 19/042* (2006.01)
*G05B 19/409* (2006.01)

(52) U.S. Cl.
CPC ............. *G05B 19/409* (2013.01); *G05B 9/02* (2013.01); *G05B 19/0423* (2013.01); *G05B 2219/31093* (2013.01); *G05B 2219/31105* (2013.01)

(58) Field of Classification Search
None
See application file for complete search history.

(56) References Cited

U.S. PATENT DOCUMENTS

| 6,211,782 B1* | 4/2001 | Sandelman ......... G06F 11/0748 340/506 |
| 2003/0212530 A1 | 11/2003 | Bibelhausen et al. |
| 2008/0224542 A1 | 9/2008 | Freeman et al. |
| 2011/0178611 A1* | 7/2011 | Daraiseh ............ G05B 19/4184 700/80 |
| 2012/0303150 A1 | 11/2012 | Meenakshi Sundaram et al. |
| 2014/0148940 A1 | 5/2014 | Susnjara |

(Continued)

FOREIGN PATENT DOCUMENTS

| WO | WO 2011/047428 A1 | 4/2011 |
| WO | WO 2012/161945 A2 | 11/2012 |

*Primary Examiner* — Ryan A Jarrett
(74) *Attorney, Agent, or Firm* — Norman B. Thot

(57) ABSTRACT

A system for controlling a remotely controlled equipment. The system includes an operator station with a main operating device which is operated by an operator to provide a main operating device signal, an operator station controller, and a confirmation operating device which is operated by the operator to provide a confirmation operating device signal. An equipment controller is connected to the operator station controller. A first gate is connected to the equipment controller. The first gate enables an operation of the remotely controlled equipment. A critical action controller receives the confirmation operating device signal. A second gate is connected to the critical action controller. The second gate enables the operation of the remotely controlled equipment.

21 Claims, 4 Drawing Sheets

(56) References Cited

U.S. PATENT DOCUMENTS

2014/0212978 A1     7/2014  Sharpe, Jr. et al.
2015/0331399 A1*    11/2015 Hackl .................... B29C 45/76
                                                    700/83
2016/0290559 A1*    10/2016 Nair ......................... F16P 3/00

* cited by examiner

SYSTEM FOR CONTROLLING REMOTELY CONTROLLED EQUIPMENT

CROSS REFERENCE TO PRIOR APPLICATIONS

This application is a U.S. National Phase application under 35 U.S.C. § 371 of International Application No. PCT/NO2016/050007, filed on Jan. 19, 2016 and which claims benefit to Norwegian Patent Application No. 20150215, filed on Feb. 13, 2015. The International Application was published in English on Aug. 18, 2016 as WO 2016/130015 A1 under PCT Article 21(2).

FIELD

The present invention relates to equipment control and associated safety aspects. The present invention more particularly relates to a system for controlling remotely controlled equipment, for example, drilling equipment or other equipment used on a drilling rig.

BACKGROUND

A key element on a modern drilling rig is the drilling control and monitoring system. Equipment such as drilling equipment is remotely controlled by an operator by a control and monitoring system. Many operations that are performed by such a system are potentially dangerous. An operation may, for example, include manipulating heavy loads by a powerful crane and/or gripper. Proper handling of such equipment is crucial, and errors may have serious consequences.

Due to the increasing complexity of existing control and monitoring systems, a risk exists that errors may occur when performing critical operations. Both human errors and technical errors, including software errors, may take place. There is therefore a need for increased safety in such control and monitoring systems. There is in particular a need for a solution which increases the safety without exchanging existing equipment, such as main parts of the operator station, the equipment controller, etc.

SUMMARY

An aspect of the present invention is to provide an improved system for controlling remotely controlled equipment, for example, drilling equipment on a drilling rig, in particular to increase safety aspects of the system.

In an embodiment, the present invention provides a system for controlling a remotely controlled equipment. The system includes an operator station comprising a main operating device which is configured to be operated by an operator to provide a main operating device signal, an operator station controller, and a confirmation operating device which is configured to be operated by the operator to provide a confirmation operating device signal. An equipment controller is connected to the operator station controller. A first gate is connected to the equipment controller. The first gate is configured to enable an operation of the remotely controlled equipment. A critical action controller is configured to receive the confirmation operating device signal. A second gate is connected to the critical action controller. The second gate is configured to enable the operation of the remotely controlled equipment.

Additional features and principles of the present invention will be recognized from the detailed description below.

It is to be understood that both the foregoing general description and the following detailed description are exemplary and explanatory only and are not restrictive of the present invention.

BRIEF DESCRIPTION OF THE DRAWINGS

The present invention is described in greater detail below on the basis of embodiments and of the drawings in which.

DETAILED DESCRIPTION

Figure 1:
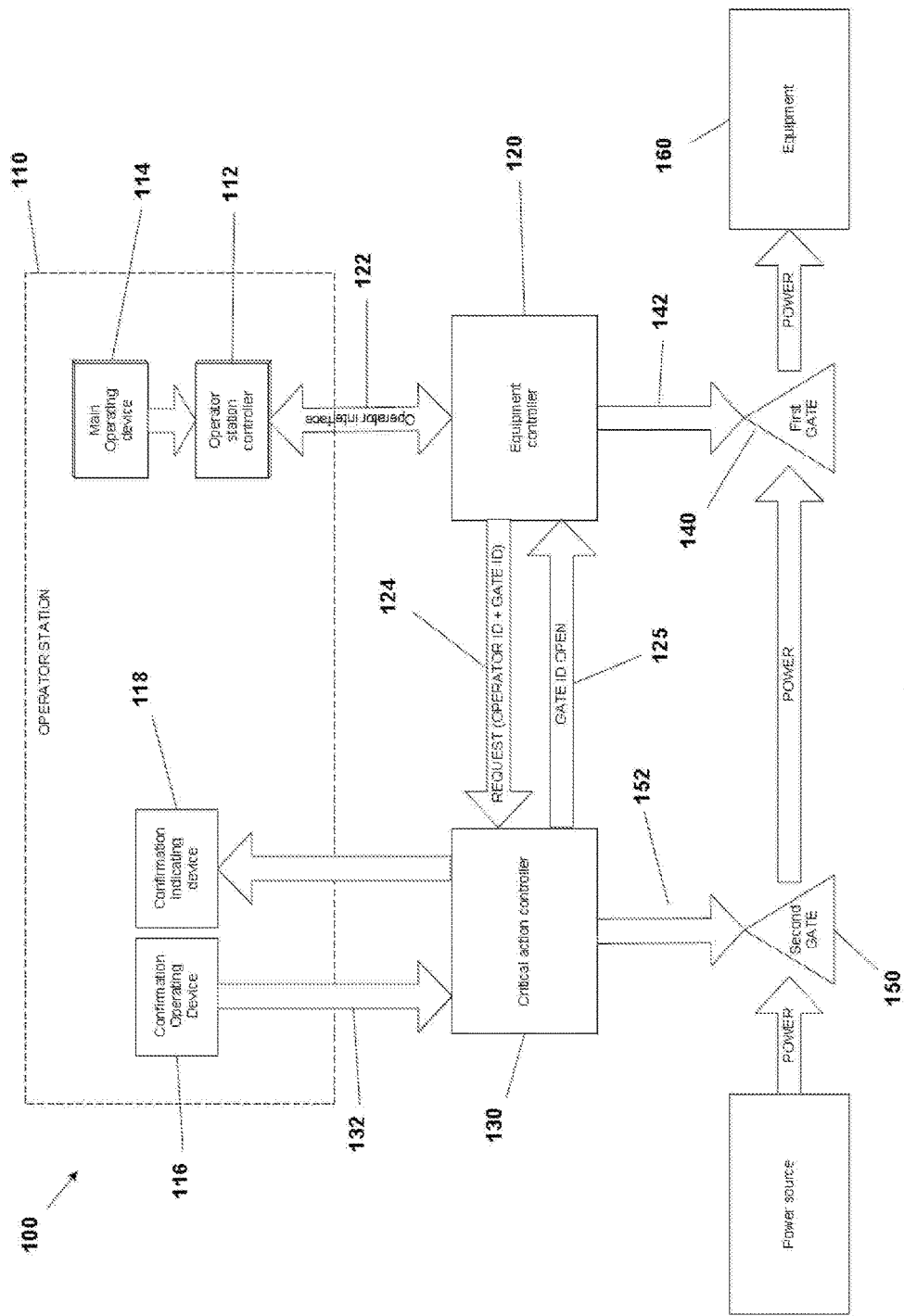
FIG. 1 shows an exemplary block diagram illustrating principles of a system for controlling a remotely controlled equipment.

FIG. 1 is an exemplary block diagram illustrating principles of a system 100 for controlling a remotely controlled equipment. The system 100 may, in a typical application, be a system for controlling drilling equipment on a drilling rig.

The term "drilling equipment" as used herein may include a variety of equipment, structures and machinery used on a drilling rig, including cranes, hoisting arrangements, transporting/handling devices, drawworks, derricks, top drives, etc.

An operator station 110 includes an operator station controller 112, which is communicatively connected to a main operating device 114. The main operating device 114 is configured to be operated by an operator, for example, manually.

The operator station 110 typically also includes at least one display device (not shown in the drawings) which is also communicatively connected to the operation station controller 112.

The operator station 110 may typically be located in a control room, located remotely from the location of the equipment to be controlled.

The display device(s) may, for example, be configured to display remotely captured image data and/or video data, such as video data captured by a video camera arranged at the remotely controlled equipment or in its environment. With such features, the system 100 acts as a combined monitoring and control system for remotely monitoring and controlling the equipment, for example, the drilling equipment on the drilling rig.

The display device may also be configured to display various process information, status information, warnings, alarms, etc., to the operator.

In a typical example, the main operating device 114 may be embodied as an operator input element in a touch panel which combines the functionality of the main operating device 114 and the display device. Alternatively or in addition thereto, the main operating device 114 and other operating devices included in the operation station 110 may comprise touch panel(s), joystick(s), multifunction wheel(s), pushbutton(s) and/or other types of input device(s).

The operator station 110 may typically include an operator chair to which at least some of the operating device(s) and/or display device(s) are attached, in order to form a fully integrated workstation.

The operator station controller 112 may include a central processing unit, a communication bus, I/O devices, memory, and firmware and application software that may be held in the memory.

The operator station controller 112 is communicatively connected, via a first interface 122, to an equipment controller 120.

The equipment controller 120 may include a central processing unit, a communication bus, I/O devices, memory, and firmware and application software that may be held in the memory.

Multiple equipment controllers 120 may be connected to each operator station 110.

The equipment controller 120 provides a first output signal 142 which is further connected to a remotely controlled equipment 160.

The equipment controller 120 is more specifically connected to a first gate 140 that enables operation of the remotely controlled equipment 160 in dependency of the first output signal provided by the equipment controller 120.

In order to improve safety aspects, the system 100 includes certain additional features. More specifically, the operator station 110 further includes a confirmation operating device 116 which is also to be operated by the operator. The confirmation operating device 116 may, for example, be a particular CONFIRM pushbutton included in the operator station 110. The confirmation operating device 116 may alternatively be a confirmation input device.

The confirmation operating device 116 may advantageously be embodied separately from the main operating device 114. However, the confirmation operating device 116 and the main operating device 114 are both included in the operator station 110 and are arranged to be operated by the operator.

The confirmation operating device 116 is communicatively connected to a critical action controller 130. The critical action controller 130 may, for example, be a critical action gatekeeper and may be implemented in compliance to certain safety requirements. The critical action controller 130 may include a central processing unit, a communication bus, I/O devices, memory, and firmware and application software that may be held in the memory.

The critical action controller 130 is configured to receive a confirmation operating device signal 132. The critical action controller 130 provides an output signal, based, for example, on a received confirmation operating device signal 152, and is connected to a second gate 150 that enables operation of the remotely controlled equipment 160 in dependency of the provided output signal.

The critical action controller 130 provides a second output signal which is connected to the remotely controlled equipment 160.

The critical action controller 130 may handle several different actions, and may thus control multiple gates 150, potentially on multiple equipment.

A communication channel may interconnect the critical action controller 130 and the equipment controller 120.

The operator station 110 may advantageously further include a confirmation indicating device 118 which is communicatively connected to the critical action controller 130. The confirmation indicating device 118 may include an optical indicator, or other type of indicator, to be observed by the operator.

Figure 2:
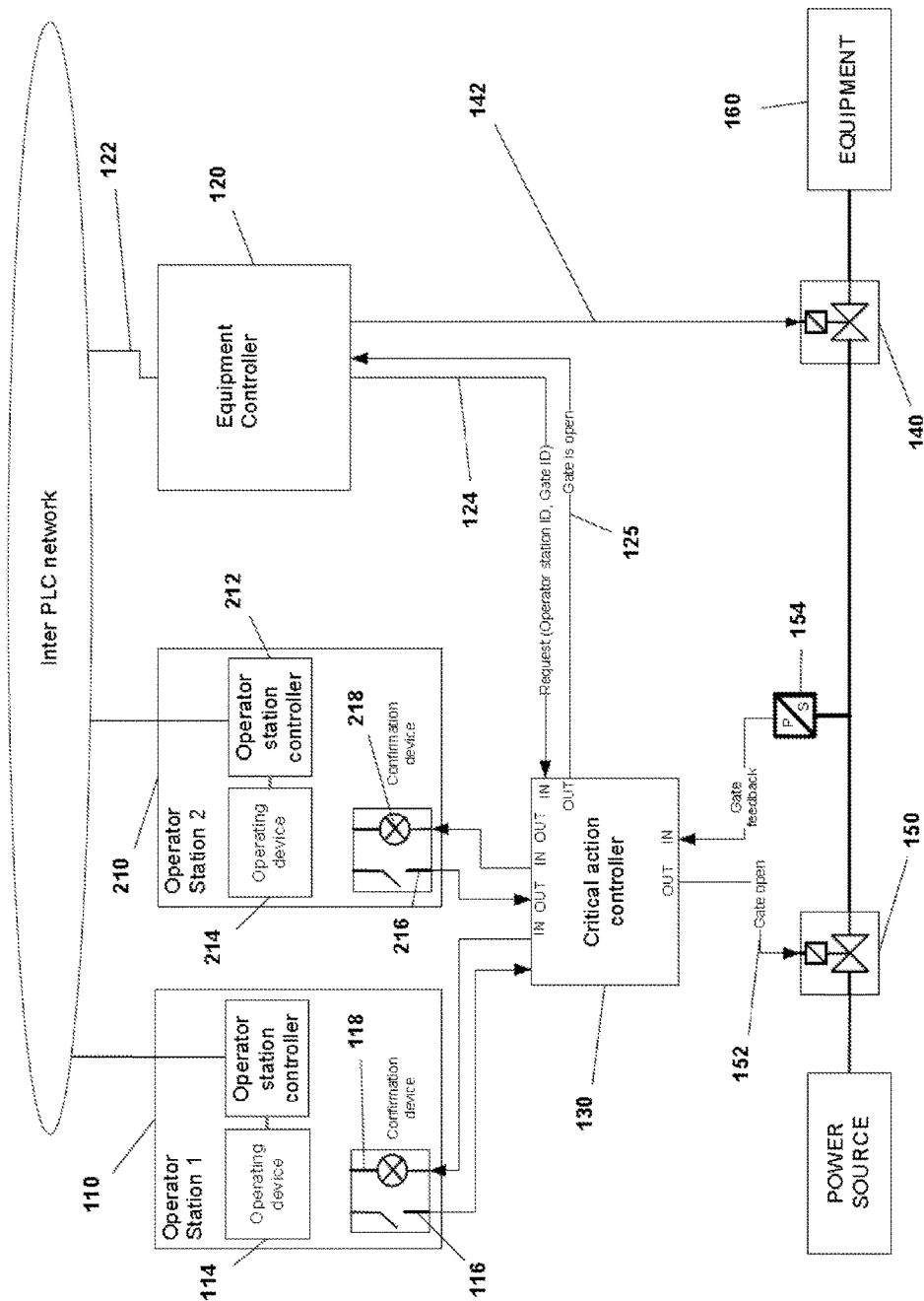
FIG. 2 shows an exemplary block diagram illustrating further principles of a system for controlling a remotely controlled equipment.

FIG. 2 shows substantially the same features as those shown in FIG. 1. Any element or feature described with reference to FIG. 1 may also be included in the system shown in FIG. 2. FIG. 2 additionally shows an additional operator station 210 which is connected to the same critical action controller 130. The critical action controller 130 may be arranged to be connected to multiple operator stations 110, 210, such as two, three or more.

The equipment controlled by the equipment controller 120 may be operated from one of the two operator stations, 110 or 210.

In the system of FIG. 2, the single interconnection between the operator station controller 112 and the equipment controller 120 has been embodied as a network connection via a network illustrated as "Inter PLC network". Both operator stations 110 and 210 are thereby communicatively interconnected to the equipment controller 120.

The critical action controller 130 may advantageously be communicatively interconnected with the equipment controller 120 by a communication line.

The communication line is used for transferring requests to the critical action controller 130 from the equipment controller 120. A request 124 may be formed as a unique key and may include:

1. Identification of the operator station 110 from where the equipment is controlled. It is necessary to identify the operator station 110 from which the operator activated the main operating device 114 because one of the remotely controlled equipment 160 may be operated from multiple operator stations. The critical action controller 130 will thereby only accept confirm input 116 from the correct operator station 110.
2. Identification of the gate 150 to be opened. It is necessary to identify which gate 150 to open if one critical action controller 130 controls several gates 150.

The communication line 125 gives feedback to the equipment controller 120 that the gate 150 is open so that the action on the first gate 140 can be activated, leading to execution of the critical function on the remotely controlled equipment 160.

In another aspect of the system 100, the critical action controller 130 may be arranged to be connected to multiple equipment controllers, such as the equipment controller 120. In still another aspect of the system 100, the critical action controller 130 may be configured to control multiple second gates, such as the second gate 150.

In any of the above described aspects of the system 100, in particular where there are a plurality of operator stations in the system, the critical action controller 130 may be configured to receive a request code from an equipment controller 120. This request code may advantageously uniquely identify the operator station from which the request 124 came.

In a further aspect of the present invention, the critical action controller 130 may be configured to inform an operator of the operator station 110 identified in the request 124 to confirm execution of the critical action via the confirmation operating device 116. Such information is advantageously conveyed to the operator by a confirmation indicating device 118.

The request code may further identify the second gate 150 that enables operation of the remotely controlled equipment 160.

The critical action controller 130 may in particular be configured to open the second gate 150 identified by the request code for a predefined time when the operator has confirmed execution by the confirmation operating device 116.

In this aspect, the equipment controller 120 may also be configured to open the first gate 140 while the second gate 150 is being kept open by the critical action controller 130.

Optionally, in the system, the critical action controller 130 may further be configured to monitor a validity of the request 124. The critical action controller 130 may advantageously also verify the request 124. Such monitoring and verifying may be performed in order to identify a possible malfunction of the equipment controller 120.

The critical action controller 130 may also be configured to monitor the confirmation operating signal 132 provided by the confirmation operating device 116. The critical action controller 130 may also verify the confirmation operating signal 132. Such monitoring and verifying may be performed in order to identify a possible malfunction of the confirmation operating device 116.

In another aspect of the system 100, the critical action controller 130 may be configured to monitor the second gate 150. Such monitoring may be performed continuously. The critical action controller 130 may also advantageously verify a correct operation of the second gate 150 in order to identify a possible malfunction of the second gate 150.

The critical action controller 130 may in particular be configured to enter an inoperative state, for example, a state denoted "TRIPPED", in the event of a malfunction of equipment controller 120, confirmation operating device 116, or second gate 150, identified by monitoring/verifying features described above.

Figure 3:
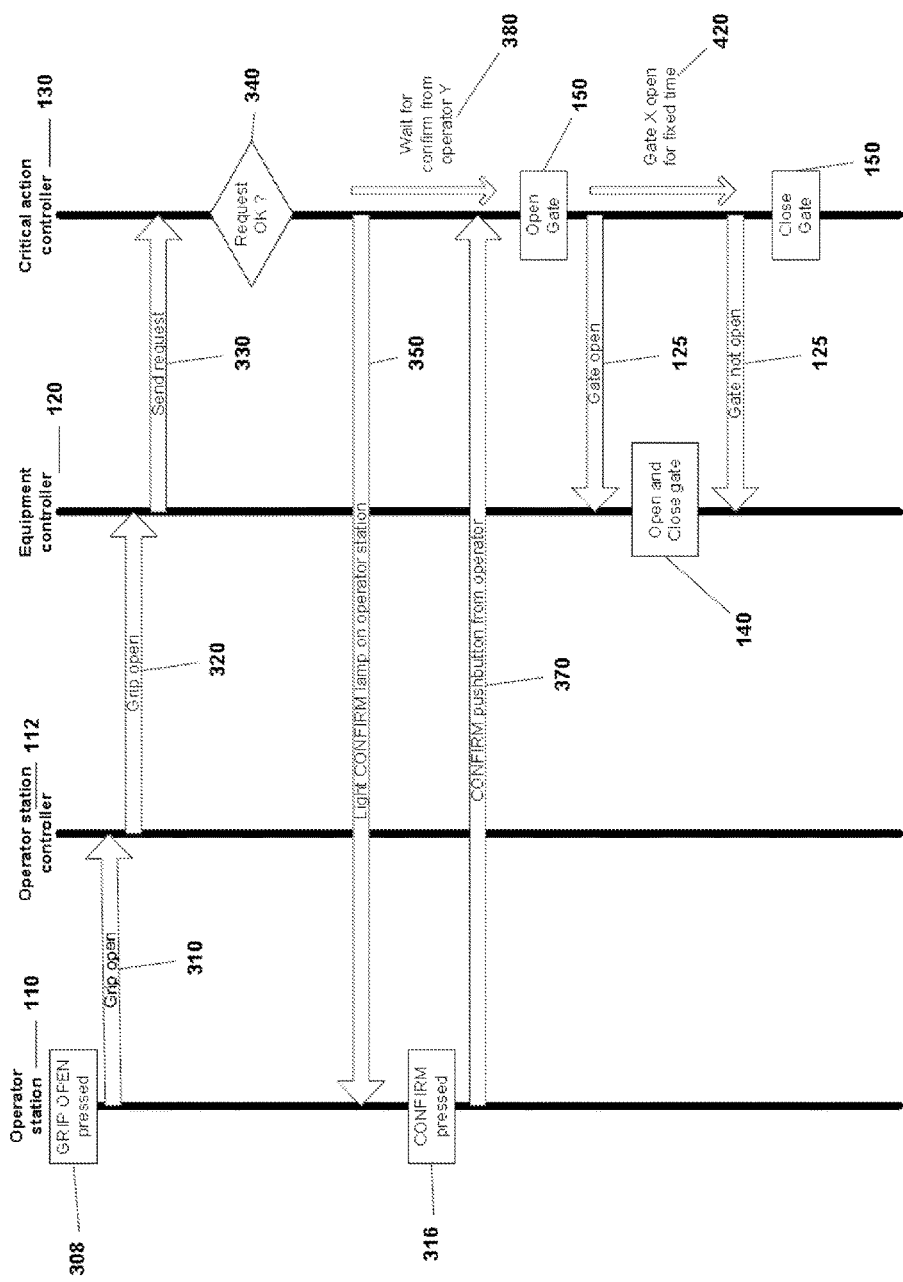
FIG. 3 shows an exemplary timing diagram illustrating process steps that may be performed in the system.

The critical action controller 130 may in particular be configured to remain in the inoperative state ("TRIPPED") until the critical action controller 130 is reset by an externally provided reset signal. FIG. 3 is a timing diagram illustrating certain process steps that may be performed in the system.

The leftmost vertical line is associated with actions performed at main operating device 114 included in the operator station 110. The next vertical line is also associated with actions performed at an operator station, such as the operator station 110, but these actions are performed at the operator station controller 112. The next vertical line is associated with actions performed at the equipment controller 120. The next and rightmost vertical line is associated with actions performed at the critical action controller 130.

FIG. 3 in particular shows an example from a crane operation. In this case, the critical operation in question is related to a gripping device for securing the load carried by the crane (gripper). The actual operation in question opens this gripping device, which again releases the load held by the gripping device.

The sequence starts when the operator activates "GRIP OPEN" 308 on the main operating device 114 on operator station 110. As a response, in step 310, the main operating device 114 sends the "GRIP OPEN" signal to the operator station controller 112. In step 320, the operator station controller routes the "GRIP OPEN" signal to the designated equipment controller 120. In step 330, the equipment controller 120 sends a request 124 to the critical action controller 130. The critical action controller 130 evaluates the request 124, in step 340, to determine if the ID information in the request 124 is valid.

If the evaluation in step 340 succeeds, the critical action controller 130 activates the confirmation indicating device 118 on the originating operator station 110 and starts waiting, in step 380, for the operator to press the confirmation operating device, or CONFIRM pushbutton, 116.

When the operator presses the CONFIRM pushbutton, or otherwise operates the confirmation operating device 116, the CONFIRM signal instructs, in step 370, the critical action controller 130 to open the second gate 150. The critical action controller 130 meanwhile informs the equipment controller 120 that the gate is open 125. When a fixed time for gate opening has elapsed, in step 420, the critical action controller 130 informs the equipment controller 125 and closes the gate, in step 150.

Figure 4:
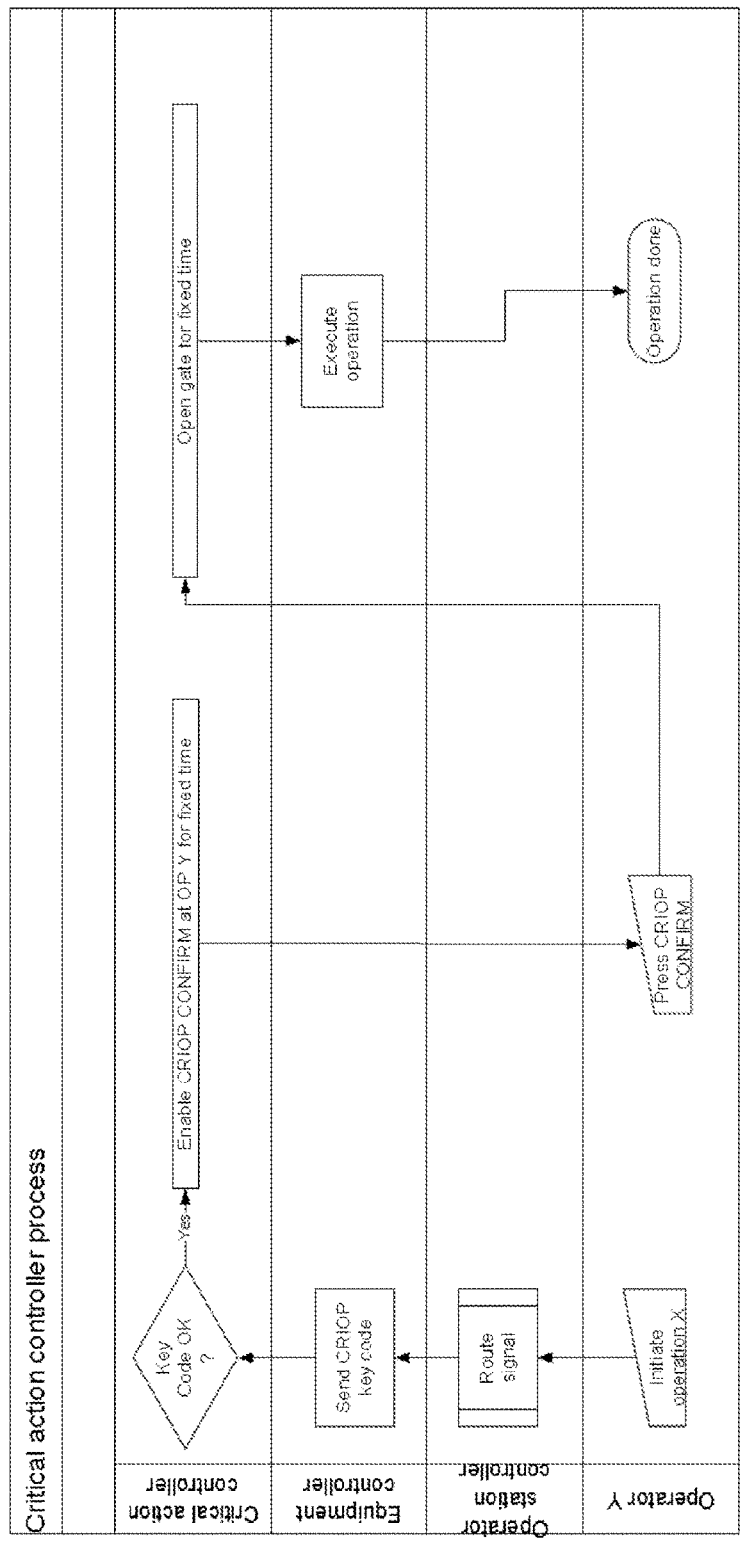
FIG. 4 shows is an exemplary flowchart further illustrating process steps that may be performed in the system.

FIG. 4 is an exemplary flowchart further illustrating process steps that may be performed in the system, including a critical action controller process.

The upper horizontal line of figure elements in FIG. 4 illustrates steps that may be associated with and/or performed at the critical action controller 130. The second horizontal line in FIG. 4 illustrates steps that may be associated with and/or performed at the equipment controller 120. The third horizontal line illustrates steps that may be associated with and/or performed at the operator station controller 112. The fourth, lower horizontal line in FIG. 4 illustrates steps that may be associated with and/or performed by the human operator.

As shown in FIG. 4, the operator first initiates a critical operation by a main operating device 114, resulting in a main operating device signal. An operator station controller 112, included in an operator station 110, then routes the main operating device signal to the equipment controller 120. The equipment controller 120 sends a request 124 to the critical action controller 130. The request 124 may include an ID information, or "CRIOP key code", which identifies the operator station 110 that sent the request 124. The critical action controller 130 checks if the ID information in the request 124 is valid, and if so, the critical action controller further activates the confirmation indicating device 118. The operator then operates the confirmation operating device 116, "Press CRIOP CONFIRM", which results in the second gate 150 being opened by the critical action controller 130. The critical action controller 130 keeps the second gate 150 open for a predetermined time. Then the desired operation (for example, gripping a crane) is performed by the equipment controller 120, and the operator may be informed that the operation has been done.

The above detailed description has explained the invention by way of example. A person skilled in the art will realize that numerous variations and alternatives to the detailed embodiment exist within the scope of the appended claims. Reference should also be had to the appended claims.

What is claimed is:

1. A system for controlling a remotely controlled equipment, the system comprising:
   an operator station comprising,
      a main operating device which is configured to be operated by an operator to provide a main operating device signal,
      an operator station controller, and
      a confirmation operating device which is configured to be operated by the operator to provide a confirmation operating device signal;
   an equipment controller which is connected to the operator station controller;
   a first gate which is connected to the equipment controller, the first gate being configured to enable an operation of the remotely controlled equipment;
   a critical action controller configured to receive the confirmation operating device signal; and
   a second gate which is connected to the critical action controller, the second gate being configured to enable the operation of the remotely controlled equipment.

2. The system as recited in claim 1, further comprising:
   a communication channel configured to interconnect the critical action controller and the equipment controller.

3. The system as recited in claim 1, further comprising:
a plurality of operating devices configured to be operated by the operator,
wherein,
the main operating device is arranged in the plurality of operating devices.

4. The system as recited in claim 3, wherein the plurality of operating devices comprise at least one of a touch panel, a joystick, a steering wheel, a multifunction wheel, and a pushbutton.

5. The system as recited in claim 1, wherein the confirmation operating device is a confirmation input device.

6. The system as recited in claim 5, wherein the confirmation operating device is arranged separately from the main operating device.

7. The system as recited in claim 1, wherein the operator station (110) further comprises a confirmation indicating device.

8. The system as recited in claim 7, wherein the confirmation indicating device comprises an optical indicator which is configured to be observed by the operator.

9. The system as recited in claim 7, further comprising:
a plurality of operator stations,
wherein,
the critical action controller is configured to be connected to the plurality of operator stations.

10. The system as recited in claim 9, further comprising:
a plurality of equipment controllers;
wherein,
the critical action controller is configured to be connected to the plurality of equipment controllers.

11. The system as recited in claim 10, further comprising:
a plurality of second gates,
wherein,
the critical action controller is configured to control the plurality of second gates.

12. The system as recited in claim 9, wherein,
the equipment controller is configured to issue a request code,
the request code uniquely identifies the operator station from which a request originated, and
the critical action controller is further configured to receive the request code from the equipment controller.

13. The system as recited in claim 12, wherein the critical action controller is further configured to inform, via the confirmation indicating device, the operator of the operator station identified in the request to confirm execution of a critical action via the confirmation operating device.

14. The system as recited in claim 12, wherein the request code further identifies the second gate.

15. The system as recited in claim 14, wherein the critical action controller is further configured to open the second gate identified by the request code for a predefined time when the operator has confirmed execution via the confirmation operating device.

16. The system as recited in claim 15, wherein the equipment controller is further configured to open the first gate while the second gate is being kept open by the critical action controller.

17. The system as recited in claim 16, wherein the critical action controller is further configured to monitor a validity of the request.

18. The system as recited in claim 17, wherein,
the confirmation operating device is further configured to provide a secondary operating device signal, and
the critical action controller is further configured to monitor the secondary operating device signal.

19. The system as recited in claim 18, wherein the critical action controller is further configured to monitor the second gate.

20. The system as recited in claim 1, wherein the critical action controller is further configured to enter into an inoperative state if a malfunction occurs in at least one of the equipment controller, the confirmation operating device, and the second gate.

21. The system as recited in claim 20, wherein the critical action controller is further configured to remain in the inoperative state until it is reset by an externally provided reset signal.

* * * * *